US008812849B1

(12) United States Patent
Ubl

(10) Patent No.: US 8,812,849 B1
(45) Date of Patent: Aug. 19, 2014

(54) SYSTEM AND METHOD FOR CONTROLLING THE UPLOAD OF DATA ALREADY ACCESSIBLE TO A SERVER

(75) Inventor: Malte Ubl, Hamburg (DE)

(73) Assignee: Google Inc., Mountain View, CA (US)

( * ) Notice: Subject to any disclaimer, the term of this patent is extended or adjusted under 35 U.S.C. 154(b) by 129 days.

(21) Appl. No.: 13/245,663

(22) Filed: Sep. 26, 2011

Related U.S. Application Data

(63) Continuation of application No. 13/156,312, filed on Jun. 8, 2011.

(51) Int. Cl.
*H04L 9/32* (2006.01)
*G06F 17/00* (2006.01)
*H04L 29/08* (2006.01)
*G06F 17/30* (2006.01)

(52) U.S. Cl.
CPC ............... *H04L 9/3236* (2013.01); *H04L 67/06* (2013.01); *G06F 17/30156* (2013.01)
USPC ......................................... 713/172; 707/692

(58) Field of Classification Search
CPC .. H04L 9/3236; H04L 67/06; G05F 17/30156
USPC .................................. 713/187, 172; 707/692
See application file for complete search history.

(56) References Cited

U.S. PATENT DOCUMENTS

| | | | |
|---|---|---|---|
| 6,389,433 B1 * | 5/2002 | Bolosky et al. ............... | 707/749 |
| 6,944,634 B2 * | 9/2005 | Hertling et al. ........................ | 1/1 |
| 7,275,244 B1 | 9/2007 | Charles Bell et al. | |
| 7,996,371 B1 * | 8/2011 | Deshmukh ..................... | 707/692 |
| 2006/0253440 A1 * | 11/2006 | Reed et al. ......................... | 707/7 |
| 2007/0100913 A1 | 5/2007 | Sumner et al. | |
| 2008/0077630 A1 * | 3/2008 | Keith .............................. | 707/204 |
| 2008/0270436 A1 | 10/2008 | Fineberg et al. | |
| 2009/0144224 A1 * | 6/2009 | Phan et al. ......................... | 707/1 |
| 2009/0222450 A1 * | 9/2009 | Zigelman ......................... | 707/10 |
| 2010/0082713 A1 * | 4/2010 | Frid-Nielsen et al. ......... | 707/821 |
| 2010/0198797 A1 * | 8/2010 | Wideman ....................... | 707/692 |
| 2010/0250858 A1 * | 9/2010 | Cremelie et al. .............. | 711/136 |
| 2010/0293142 A1 * | 11/2010 | Ackerman et al. ............ | 707/640 |
| 2011/0055471 A1 * | 3/2011 | Thatcher et al. .............. | 711/114 |
| 2011/0082984 A1 | 4/2011 | Yuan | |
| 2011/0145259 A1 | 6/2011 | Pasquariello et al. | |
| 2012/0221525 A1 | 8/2012 | Gold et al. | |

OTHER PUBLICATIONS

File API, W3C Working Draft Oct. 26, 2010, Retrieved from the internet <URL:w3.org/TR/2010/WD-FileAPI-20101026/>, pp. 1-32 as printed.*

* cited by examiner

*Primary Examiner* — Michael Chao
(74) *Attorney, Agent, or Firm* — McDermott Will & Emery LLP

(57) ABSTRACT

Systems, methods, and machine-readable media for controlling an upload of a block of data associated with an upload command are described. In certain aspects, an interface module may be configured to obtain a cryptographic checksum for the block of data associated with the upload command. A checksum module may configured to compare the cryptographic checksum for the block of data associated with the upload command to a cryptographic checksum in an index storing cryptographic checksums identifying blocks of data previously uploaded to a server. If the cryptographic checksum for the block of data associated with the upload command matches the cryptographic checksum in the index, an upload module may be configured to cancel the upload of the block of data associated with the upload command.

19 Claims, 7 Drawing Sheets

| INDEX | |
|---|---|
| checksum1 | reference1 |
| checksum2 | reference2 |
| checksum3 | reference3 |
| checksum4 | reference4 |
| checksum5 | reference5 |
| checksum6 | reference6 |
| checksum7 | reference7 |
| checksum8 | reference8 |

SYSTEM AND METHOD FOR CONTROLLING THE UPLOAD OF DATA ALREADY ACCESSIBLE TO A SERVER

RELATED APPLICATION

This application is a continuation of U.S. patent application Ser. No. 13/156,312, filed on Jun. 8, 2011, entitled "SYSTEM AND METHOD FOR CONTROLLING THE UPLOAD OF DATA ALREADY ACCESSIBLE TO A SERVER," the entire contents of which are herein incorporated by reference in its entirety.

BACKGROUND

The present disclosure generally relates to the transmission of data from one location to another.

Files or other data are often transmitted or uploaded to a server. For example, in order to email a file to another person, a user of an email service may first need to upload the file to one or more email servers hosting the email service. Users of social networking platforms may also upload files (e.g., images, videos, documents, audio, etc.) to a social networking server so that the files may be shared with others. In some cases, however, uploading a file may be redundant because an identical file may have been previously uploaded to the server. Furthermore, file uploads may require substantial resources and time to upload depending on the size of the file, the capabilities of the sending or receiving systems, and the platform that the upload transmission takes place on.

SUMMARY

According to one aspect of the subject technology, a system for controlling an upload of a block of data associated with an upload command is provided. The system may include an interface module, a checksum module, and an upload module. The interface module may be configured to obtain a cryptographic checksum for the block of data associated with the upload command. The checksum module may be configured to compare the cryptographic checksum for the block of data associated with the upload command to a cryptographic checksum in an index storing cryptographic checksums identifying blocks of data previously uploaded to a server. The upload module may be configured to cancel the upload of the block of data associated with the upload command if the cryptographic checksum for the block of data associated with the upload command matches the cryptographic checksum in the index.

According to another aspect of the subject technology, a method for controlling an upload of a block of data associated with an upload command is provided. The method may include obtaining a cryptographic checksum for the block of data associated with the upload command and comparing, using a processor, the cryptographic checksum for the block of data associated with the upload command to a cryptographic checksum in an index storing cryptographic checksums identifying blocks of data previously uploaded to a server. The method may also include canceling the upload of the block of data associated with the upload command if the cryptographic checksum for the block of data associated with the upload command matches the cryptographic checksum in the index.

According to yet another aspect of the subject technology, a machine-readable medium comprising instructions stored therein, which when executed by a machine, cause the machine to perform operations for controlling an upload of a block of data associated with an upload command is provided. The operations may include obtaining a cryptographic checksum for the block of data associated with the upload command, comparing, using a processor, the cryptographic checksum for the block of data associated with the upload command to a cryptographic checksum in an index storing cryptographic checksums identifying blocks of data previously uploaded to a server, and canceling the upload of the block of data associated with the upload command if the cryptographic checksum for the block of data associated with the upload command matches the cryptographic checksum in the index.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects. In the drawings:

FIG. 3 is a conceptual block diagram illustrating an index, in accordance with one aspect of the subject technology;

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

In accordance with various aspects of the subject technology, systems and methods for controlling an upload of a block of data (e.g., a file or segment of a file) associated with an upload command are disclosed. For example, an upload process for a file may be canceled when an identical file already exists and is accessible to the server (e.g., the file was previously uploaded to the server by one or more users). Instead, the file that already exists and is accessible to the server may be referenced and used. By canceling the upload of one or more files, the amount of resources (e.g., processing for the client and the server, memory on the server, bandwidth, etc.) or time used when a user tries to upload files may also be reduced.

Figure 1:
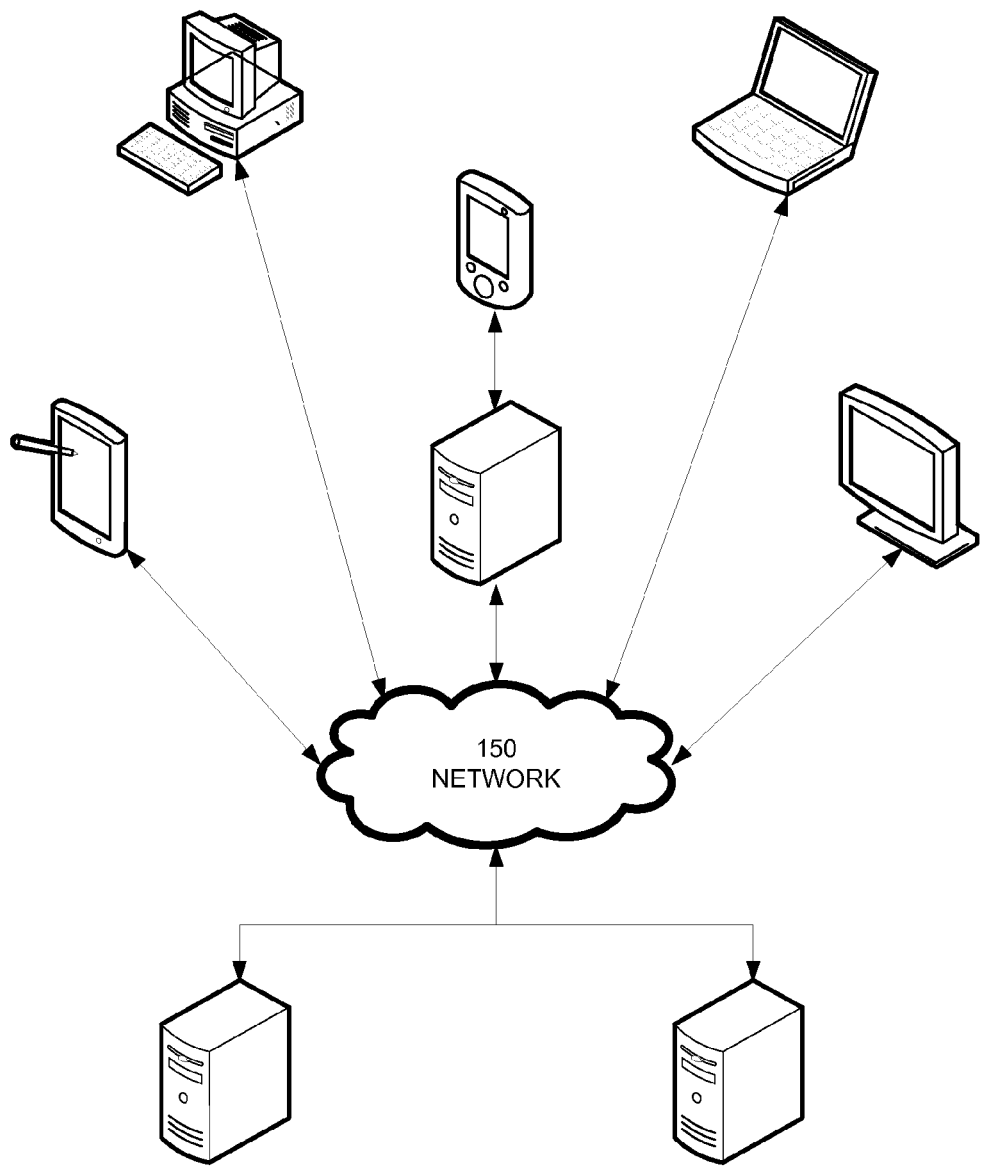
FIG. 1 is a conceptual diagram illustrating one example of a network environment in which aspects of the subject technology may be implemented.

FIG. 1 is a conceptual diagram illustrating one example of a network environment 100 in which aspects of the subject technology may be implemented. The network environment 100 includes servers 130 and clients 110 connected over a network 150. Although FIG. 1 illustrates a client-server network environment 100, other aspects of the subject technology may include other configurations including, for example, peer-to-peer environments or single system environments where files may be uploaded to one or more modules of the system.

The servers 130 can be any system or device having a processor, a memory, and communications capability for hosting various services. For example, the servers 130 may host email services, file storage or sharing services, online marketplace services, or social networking services. These services and others may be hosted independently, either on one or many separate servers 130, or hosted on the same server or servers 130. In one aspect, a server or servers 130 may be a virtual entity that might refer to a cluster or even multiple clusters of servers.

Users may interact with the various services hosted by the servers 130 on client machines (e.g., clients 110) over the network 150. Many of the interactions between a user on a client machine 110 and a service hosted on a server 130 may involve uploading data from the client machine 110 to the server 130. For example a user of the email service may wish to send a file to a colleague. To do so, the user may first need to upload the file from his client machine 110 to the servers 130 hosting the email service. In another example, a user may wish to upload an image file from his client machine 110 to an online photo-sharing service or a social networking service running on one or more servers 130.

The clients 110 can be, for example, desktop computers, mobile computers, tablet computers, mobile devices (e.g., a smart phone or PDA), set top boxes (e.g., for a television), video game consoles, thin clients, or any other devices having appropriate processor, memory, and communications capabilities. In one aspect, a server may also be a client 110. The clients 110 may be configured to run applications (e.g., a file upload program, a web browser, or other program) that may be used to issue or receive upload commands to upload data to the one or more servers 130.

The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
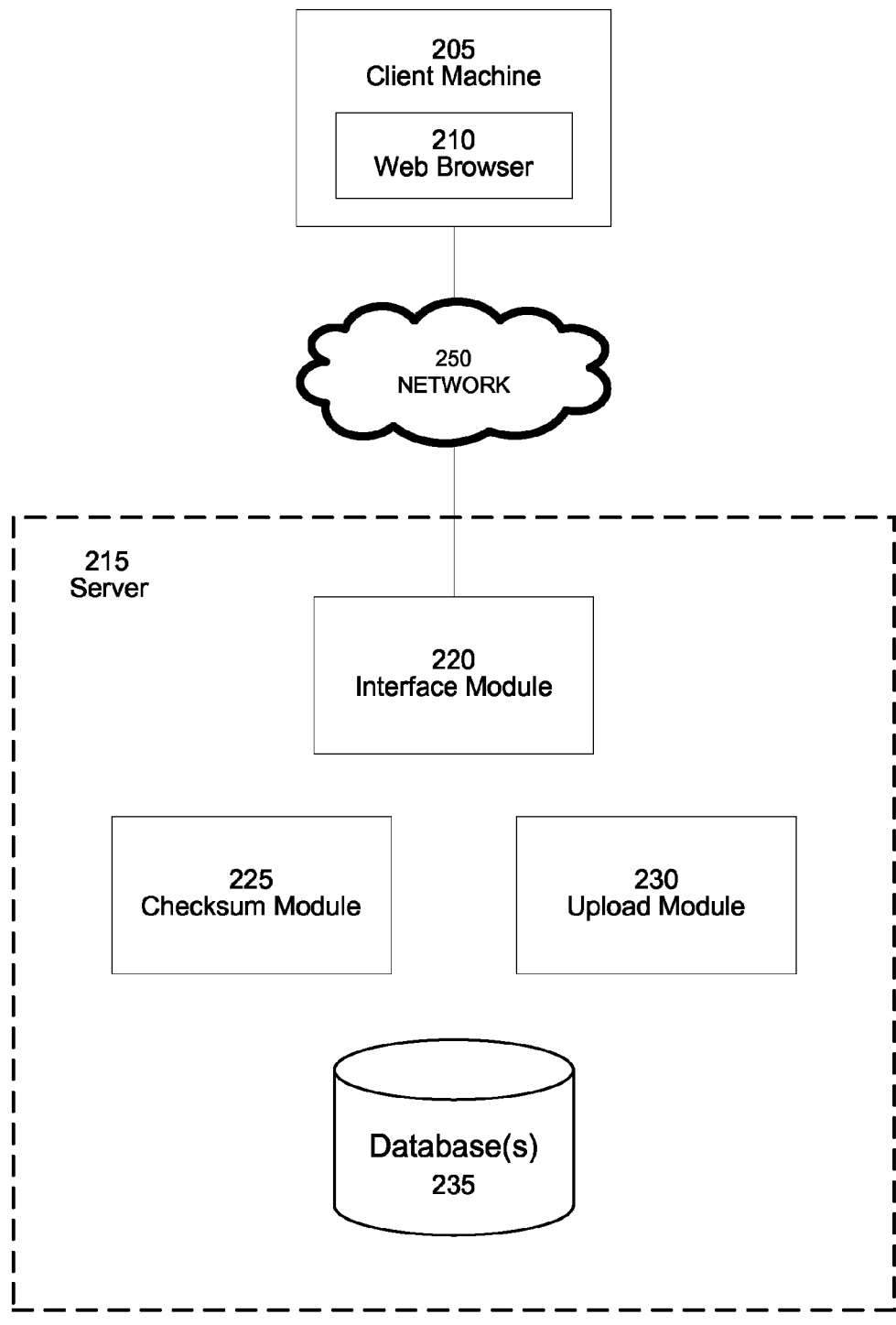
FIG. 2 is a conceptual diagram illustrating a network environment for controlling an upload of a block of data associated with an upload command, in accordance with one aspect of the subject technology.

FIG. 2 is a conceptual diagram illustrating a network environment 200 for controlling an upload of a block of data associated with an upload command, in accordance with one aspect of the subject technology. The various modules illustrated in FIG. 2 may include software instructions encoded in a medium and executed by a processor, computer hardware components, or a combination of both. For example, the various modules may each include one or more processors or memories that are used to perform the functions described below. According to another aspect, the various systems and modules may share one or more processors or memories.

FIG. 2 shows a client machine 205 that can be used to upload a file or a block of data to a server 215 via a network 250. For example, a user may use a program (e.g., a web browser 210) that presents an interface that allows the user to select one or more files to upload to the server. The program (e.g., web browser 210) may be configured to initiate an upload command and calculate a checksum (e.g., a cryptographic checksum) for each file selected for uploading.

A cryptographic checksum, also referred to as a cryptographic hash value, may be generated by a cryptographic hash function that reads in a block of data (e.g., a file or a part of a file) and returns a bit string (e.g., the cryptographic checksum). The cryptographic checksum may have several important characteristics. For example, it is computable for any given block of data, it is infeasible to determine a block of data using its cryptographic checksum, it is computationally infeasible to find two different blocks of data with the same cryptographic checksum, and it is computationally infeasible to modify a block of data without changing its cryptographic checksum. The characteristics of the cryptographic checksums computed for a file or a part of a file selected for uploading allow the file or the part of the file to be uniquely identified using their cryptographic checksums. Thus, if two pieces of data have the same cryptographic checksum, the two pieces of data are most likely identical.

One cryptographic hash function that may be used is the SHA-1 function designed by the National Security Agency (NSA) which uses a 160-bit hash function. However, other cryptographic hash functions, including stronger hash functions may be used as well.

The server 215 may include an interface module 220, a checksum module 225, an upload module 230, and one or more databases 235. The interface module 220 may be configured to communicate with one or more client machines 205 or servers. The interface module 220 may, for example, obtain cryptographic checksums for blocks of data associated with upload commands or receive blocks of data being uploaded. According to one aspect, the interface module 220 may receive cryptographic checksums and blocks of data being uploaded at the same time.

The checksum module 225 may be configured to compare a cryptographic checksum for a file or block of data associated with an upload command to the cryptographic checksums in an index to determine whether the cryptographic checksum associated with the upload command matches one of the cryptographic checksums in the index. A match would indicate that a file or a block of data identical to the file or the block of data associated with the upload command is accessible to the server 215. The checksum module 225 may also be configured to calculate cryptographic checksums and store the checksums in the index. According to one aspect, the index may contain a collection of cryptographic checksums that may be used to identify files or blocks of data that already exist and are accessible to the server 215 (e.g., files or blocks of data that were previously uploaded to the server 215).

FIG. 3 is a conceptual block diagram illustrating an index 300, in accordance with one aspect of the subject technology. Index 300 may contain cryptographic checksums for respective files or blocks of data that are accessible to the server 215. According to one aspect, the files or blocks of data are accessible to the server 215 because they have been previously uploaded to the server 215 and stored in one or more databases 235. According to another aspect, the files or blocks of data may be stored on other servers, machines, or databases and may be retrieved by the server 215 via the network 250. The location of the stored data may be identified along with the identity of the file or block of data. Along with other data about the files or blocks of data accessible to the server 215, each cryptographic checksums in the index 300 may also have a corresponding reference to the file or block of data (e.g., the location of a file or block of data or a pointer to the file or block of data) that may be used to locate and retrieve the file or block of data.

Referring back to FIG. 2, the upload module 230 may be configured to control the upload process of a file or block of data. For example, the upload module 230 may cancel the upload of a file from the client machine 205 to the server 215 and use a file already accessible to the server 215 or it may allow the interface module 220 to continue and complete the upload process.

The one or more databases 235 may store various files, programs, and data accessible to the server 215. Although FIG. 2 shows the databases 235 as being in the server 215, according to one aspect, the databases 235 may be reside on one or more other servers that may communicate with the server 215 via the network 250. According to another aspect, the index may also be stored in one of the databases 235. Further details and configurations of the modules, according to various aspects of the subject technology, are discussed below with reference to FIGS. 4-6.

Figure 4:
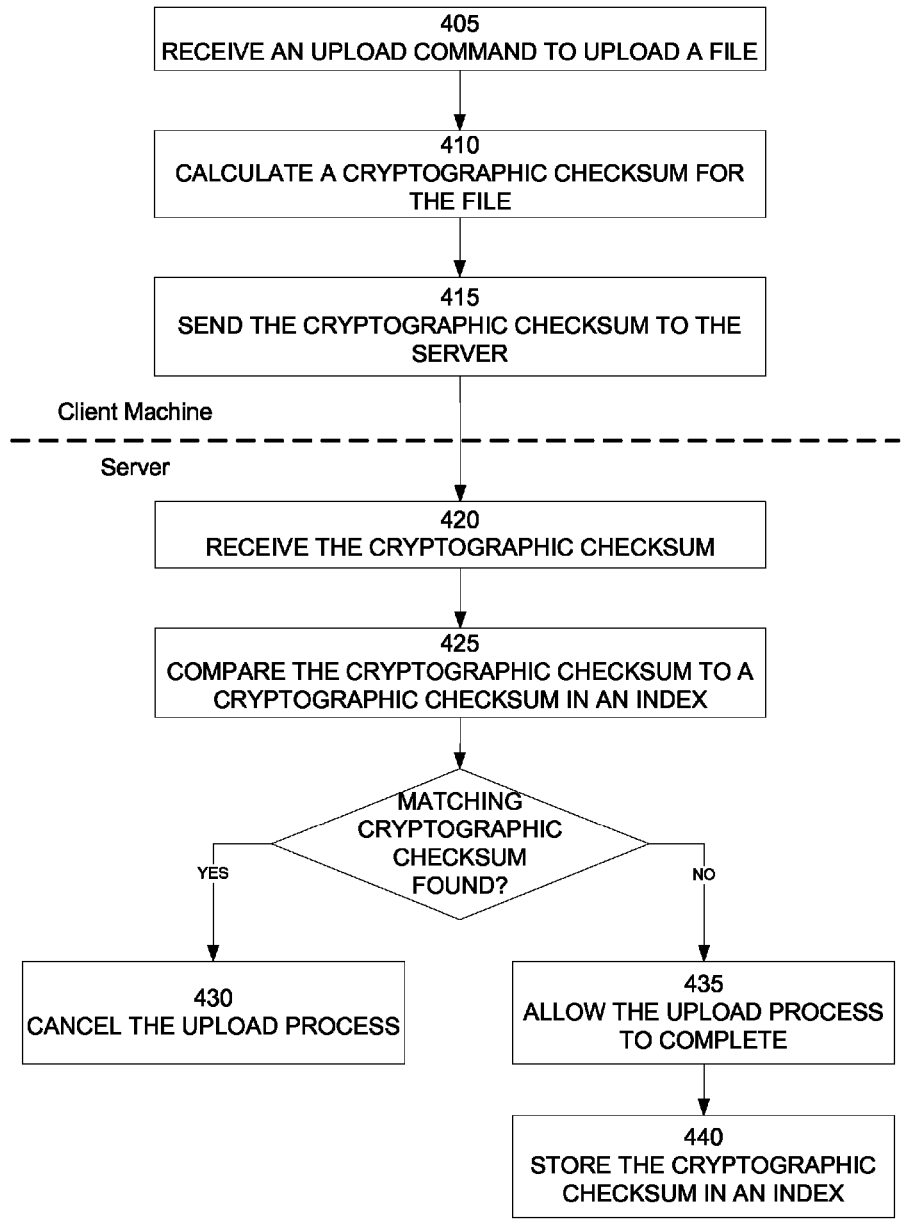
FIG. 4 is a flow chart illustrating a process for controlling an upload of a block of data associated with an upload command, in accordance with one aspect of the subject technology.

FIG. 4 is a flow chart illustrating a process 400 for controlling an upload of a block of data associated with an upload command, in accordance with one aspect of the subject technology. Although the operations in the processes described herein are shown in a particular order, certain operations may be performed in different orders or at the same time. The process 400 begins at operation 405 where a program (e.g., a web browser 210) on the client machine 205 receives an upload command to upload one or more files.

The upload command may be associated with a particular task and received from a user via an interface or from another program or device. Tasks may include, for example, uploading a file to an email server to be attached to an email, uploading a file to a file sharing website, uploading a file to be published on a social networking site, etc. For example a user of the email service may wish to attach one or more files to an email and send the email to an intended recipient. To do so, the user may select the files on the client machine 205 in an interface provided by the program or web browser 210 and initiate an upload command.

Once the upload command is received, at operation 410, the web browser 210 may calculate a cryptographic checksum for the file associated with the upload command and, at operation 415, send the cryptographic checksum to the server 215. In a first instance of an upload of a file or block of data, the cryptographic checksum for the file or block of data may be stored in an index at the server. Upon subsequent uploads of the same or an identical file or block of data, the cryptographic checksum may be sent to the server 215 and used to identify and locate the version previously uploaded in the first instance as will be discussed in more detail below.

According to one aspect, the web browser may support the Hypertext Markup Language revision 5 (HTML5) FileReader application programming interface (API) and, as a result, may be able to read the file and generate the cryptographic checksum without the need for additional plug-ins (e.g., a Flash® plug-in or Java® plug-in). Further details about the FileReader API may be found at http://www.w3.org/TR/FileAPI/, which is hereby incorporated by reference in its entirety.

Once a cryptographic checksum is calculated for the file, it may be sent, via the network 250, to an interface module 220 of a server 215. At operation 420, the interface module 220 obtains the cryptographic checksum for the file associated with the upload command. At operation 425, the checksum module 225 may compare the cryptographic checksum for the file associated with an upload command to cryptographic checksums in an index to determine whether the two cryptographic checksums match.

A match between one of the cryptographic checksums in the index and the cryptographic checksum for the file associated with the upload command may indicate that an identical file is accessible to the server 215 (e.g., that an identical file has been previously uploaded by the same user or a different user). A match may also indicate that uploading the file from the client machine 205 to the server 215 is unnecessary because the identical version accessible to the server 215 may be used. As a result, at operation 430, if a match is found, the upload module 230 may cancel the upload of the file or send a response to the client machine 205 that the client machine 205 may cancel the upload. By canceling the upload process for the file, any additional resources or time that would have been used to upload the file may be conserved.

According to one aspect, when the upload process for the file is canceled, the web browser 210 or program uploading the file may give an indication (e.g., a message or notification) that an identical file is already accessible to the server or has already been uploaded. According to another aspect, however, the web browser 210 or program uploading the file may not give any indication. Instead, the web browser 210 or program will simply act as if the upload for the file has been completed. As a result, the cancelation of the upload and use of an identical file accessible to the user is transparent to the user.

Once a match is found, the upload module 230 may also locate and retrieve the identical file accessible to the server 215 so that the file may be used. For example, the upload module 230 may identify that the identical file accessible to the server 215 exists using the matching cryptographic checksum in the index and retrieve the file using the reference to the file (e.g., the location of a file or a pointer to the file) that corresponds to the cryptographic checksum (see index 300 in FIG. 3). Once the identical file is located or retrieved, the upload module 230 may use the identical file for whatever task was associated with the upload command (e.g., attach the identical file to an email to be sent, allow the identical file to be shared on the file sharing website, publish the identical file on a social networking site, etc.).

If a match is not found, this may indicate that an identical file does not exist or is not accessible to the server 215 and, as a result, uploading the file from the client machine 205 to the server 215 may be necessary. In such a case, the upload module 230 would allow the interface module 220 to complete the upload of the file and use it for the task at operation 435.

Furthermore, in order to conserve time and computing resources in the future when the same user or a different user attempts to upload a file identical to the one just uploaded, it may be desirable to store a cryptographic checksum for the file just uploaded in the index so that the file may be identified. Similarly, it may be desirable to store a reference to the file (e.g., storage location data for the file or a pointer to the file) in the index as well so that the file may be located and retrieved for use. Thus, according to another aspect of the subject technology, the checksum module 225 may calculate a cryptographic checksum for the file just uploaded and store the cryptographic checksum in the index along with a reference to the file at operation 440.

Figure 5:
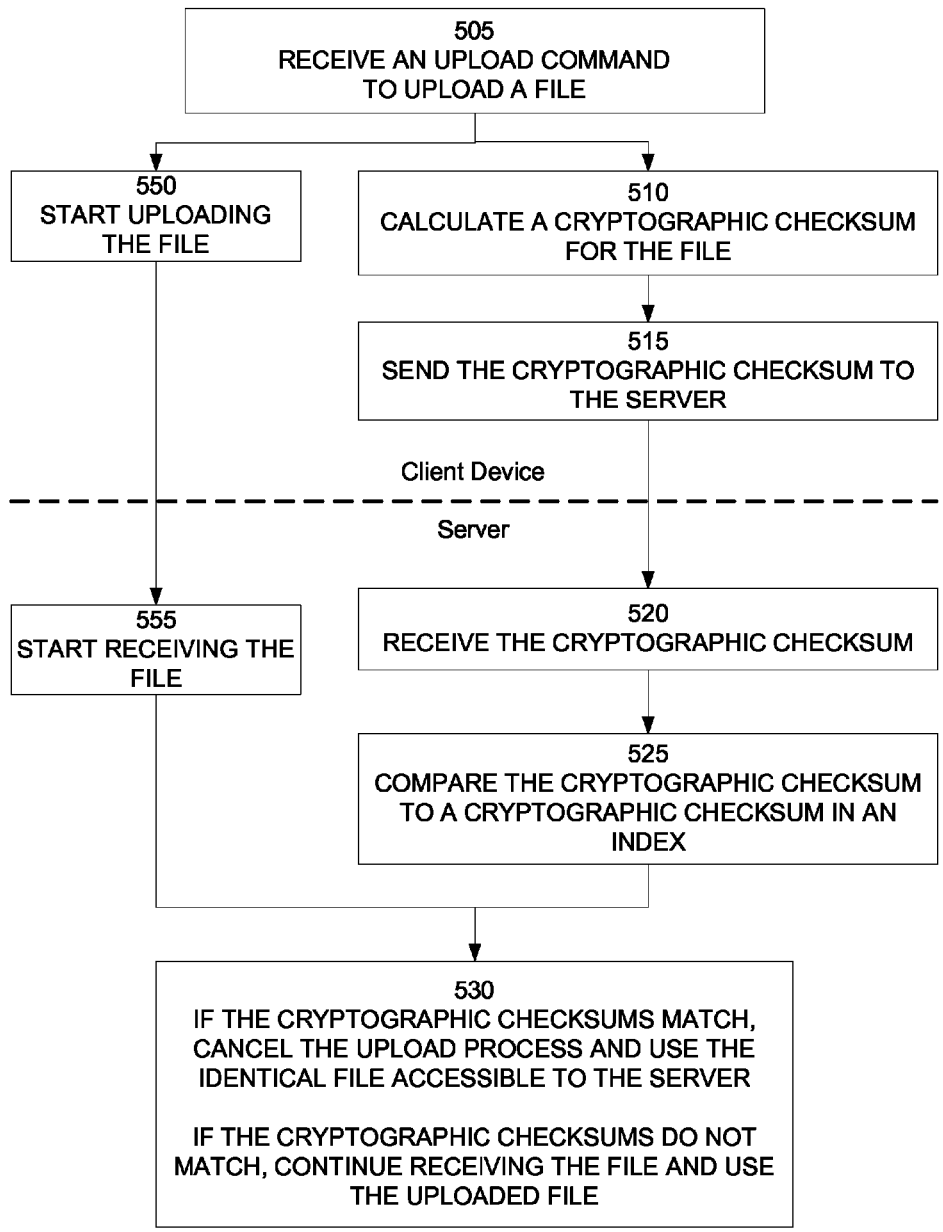
FIG. 5 is a flow chart illustrating a process for controlling an upload of a block of data associated with an upload command, in accordance with another aspect of the subject technology.

Various other aspects may involve beginning to upload a file while the process described above occurs. In many cases, the time it takes to transmit the file will be longer than the time it takes to calculate the cryptographic checksum, send it to the server 215, and determine if an identical file is accessible. Thus, if it is later determined that the upload process is to be canceled, the upload module 230 may cancel the file upload in progress. FIG. 5 helps illustrate such one such aspect.

FIG. 5 is a flow chart illustrating a process 500 for controlling an upload of a block of data associated with an upload command, in accordance with another aspect of the subject technology. The process 500 begins at operation 505 when a program receives an upload command to upload a file. After receiving the upload command, at operation 550, the program may begin uploading the file. In parallel, the program may calculate a cryptographic checksum for the file at operation 510 and send the cryptographic checksum to the server at operation 515.

From the server end, at operation 555, the interface module 220 may start receiving the file at any time. While receiving the file, the interface module 220 may also receive the cryptographic checksum for the file at operation 520 and the checksum module 225 may compare the cryptographic checksum for the file being uploaded with the cryptographic checksums in the index at operation 525.

If the cryptographic checksum for the file being uploaded matches one of the cryptographic checksums in the index, it indicates that an identical file is already accessible to the server 215 and, as a result, uploading the file may not be necessary. Thus, at operation 530, the upload module 230 may cancel the upload of the file already in progress and use the identical file accessible to the server 215. If no match is found, the upload module 230 may allow the upload process to continue (e.g., the interface module 220 will continue to receive the file) and when it is complete, the uploaded file may be used.

Figure 6:
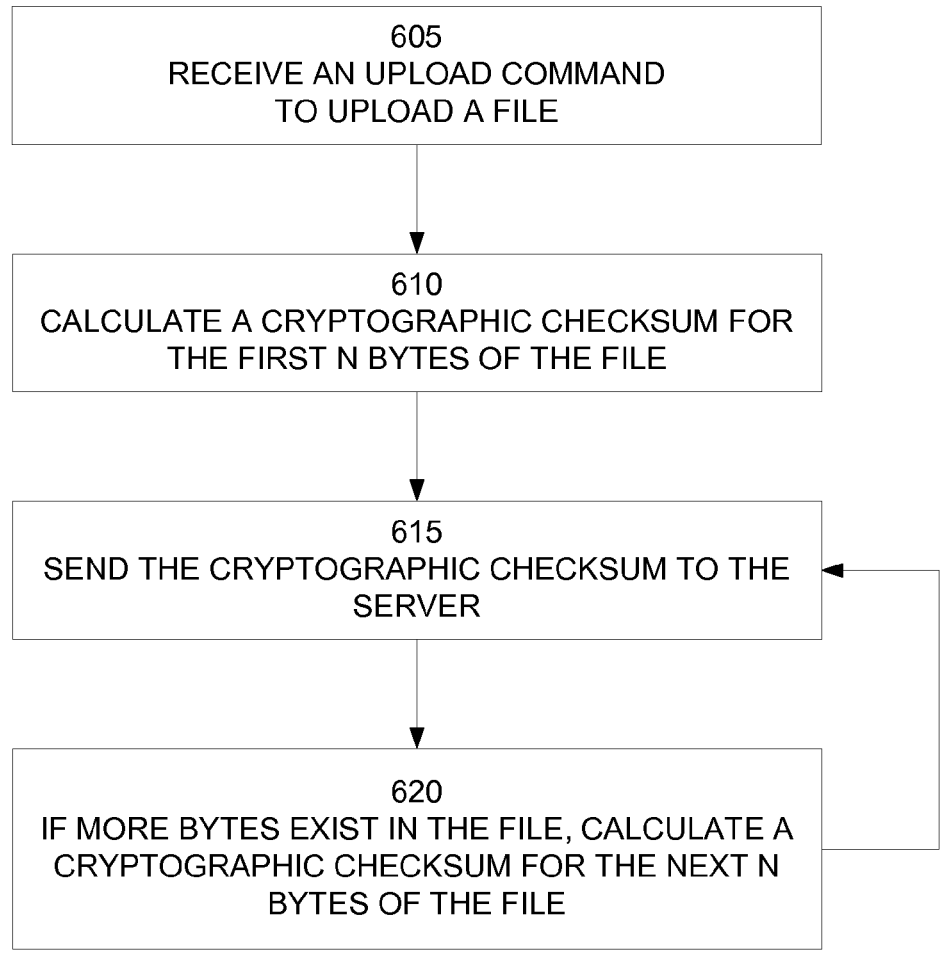
FIG. 6 is a flow chart illustrating a process for controlling an upload of a block of data associated with an upload command, in accordance with another aspect of the subject technology.

Although many aspects of the subject technology may be described in terms of uploading a file, the aspects disclosed are not limited to files and may apply to the uploading of any block of data. In some cases, a file to be uploaded may be partitioned into multiple blocks of data to be uploaded. For example, where the file associated with the upload command is large, the file may be split into a number of smaller segments and cryptographic checksums may be generated for each of the segments of the larger file. Partitioning a larger file into smaller blocks of data may improve performance because calculating a checksum for a large file may require more computational resources and computing time than calculating checksums for a number of smaller blocks of data. FIG. 6 helps illustrate such one such aspect.

FIG. 6 is a flow chart illustrating a process 600 for controlling an upload of a block of data associated with an upload command, in accordance with another aspect of the subject technology. The process 600 begins at operation 605 when a program on a client machine 205 receives an upload command to upload a file.

Instead of calculating a cryptographic checksum for the entire file, at operation 610, the program on the client machine 205 may calculate a cryptographic checksum for the first N bytes of the file. N may be an arbitrary predetermined number of bytes (e.g., 10 megabytes) or may be determined based on the capabilities of at least one of the client machine 205, the network 250, and the server 215. For example, N may be small for a mobile device that uses a cellular network and has limited memory and processing power. On the other hand, N may be bigger for a desktop computer that has a faster network connection and has more memory and processing power.

At operation 615, the client machine 205 may send the cryptographic checksum for the first N bytes of the file to the server 215 where it can be compared with other cryptographic checksums in an index to determine whether an identical block of data is accessible to the server 215. According to this aspect, the index may include cryptographic checksums for blocks of data rather than, or in addition to, cryptographic checksums for entire files. If an identical block of data is found, the upload process for that block of data (which may be occurring in parallel) may be canceled and the identical block of data may be used. If an identical block of data is not found, the upload process for that block of data may be allowed to finish.

At operation 620, if additional bytes exist in the file, cryptographic checksums for the next N bytes of the file may be calculated and sent to the server. This process may continue until no additional bytes remain in the file.

In some cases, the name of the file associated with the upload command may be different from the name of an identical file accessible to the server. For example, a user may upload a file to the server using a first file name, change the name of the file to a second file name, and attempt to upload the same file with the second file name. According to another aspect of the subject technology, the server 215 may be able to identify two files that contain identical data that have different file names or file identifiers. The client machine 205 may calculate a cryptographic checksum for the data contained in a file and send the cryptographic checksum to the server 215. The checksum module 225 at the server 215 may determine if a file containing identical data is accessible to the server by comparing the received cryptographic checksum with cryptographic checksums in an index, wherein the cryptographic checksums in the index are calculated based on the data contained in files accessible to the server 215.

Figure 7:
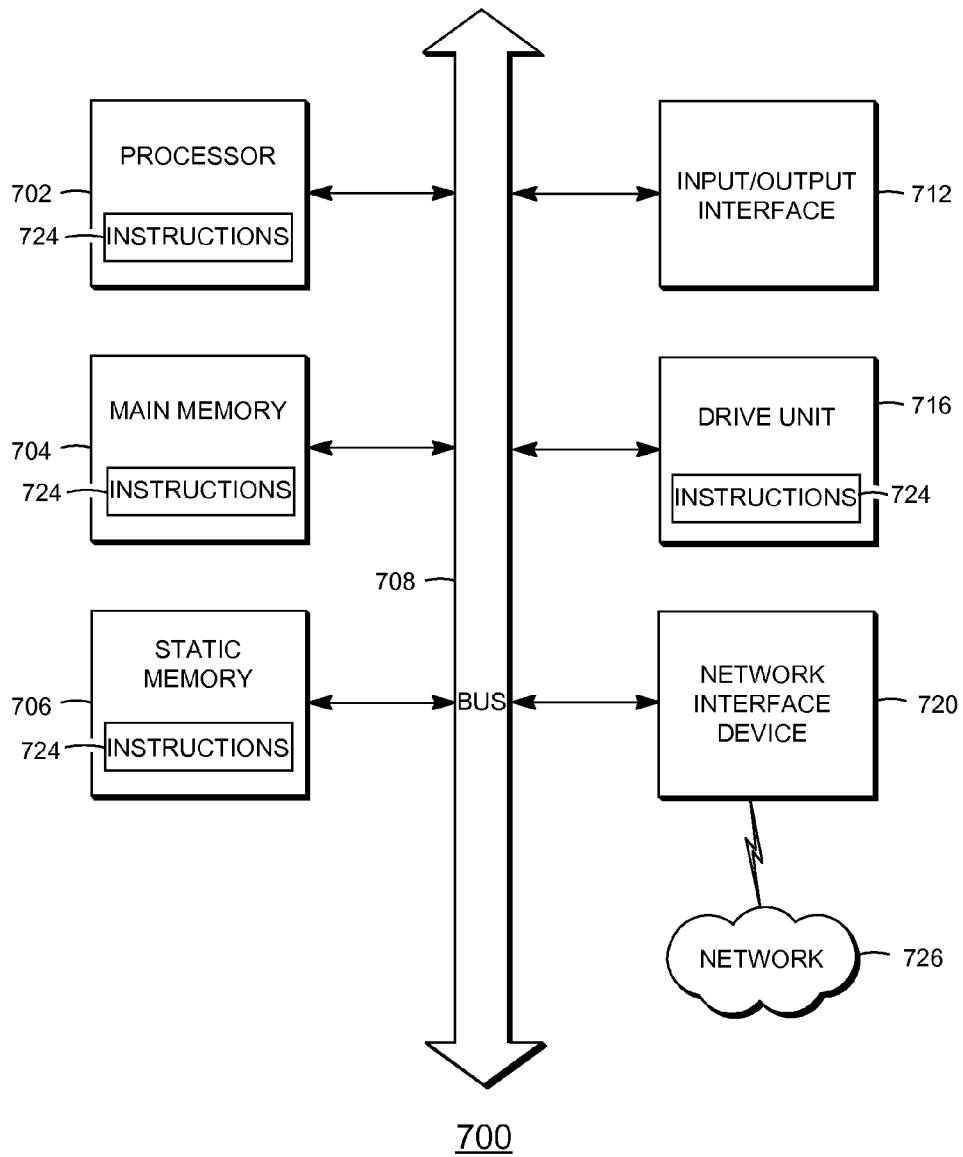
FIG. 7 is a conceptual block diagram illustrating a computer system with which each of the clients and servers of FIG. 1 may be implemented.

FIG. 7 is a block diagram illustrating a computer system with which any of the clients and servers of FIG. 1 may be implemented. In certain aspects, the computer system 700 may be implemented using hardware or a combination of software and hardware, either in a dedicated server, or integrated into another entity, or distributed across multiple entities.

The example computer system 700 includes a processor 702, a main memory 704, a static memory 706, a disk drive unit 716, and a network interface device 720 which communicate with each other via a bus 708. The computer system 700 may further include an input/output interface 712 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 702 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 724 embodying any one or more of the methodologies or functions described herein. The instructions 724 may also reside, completely or at least partially, within the main memory 704 and/or within the processor 702 during execution thereof by the computer system 700, with the main memory 704 and the processor 702 also constituting machine-readable media. The instructions 724 may further be transmitted or received over a network 726 via the network interface device 720.

The machine-readable medium may be a single medium or multiple media (e.g., a centralized or distributed database, and/or associated caches and servers) that store the one or more sets of instructions. The machine-readable medium may include the drive unit 716, the static memory 706, the main memory 704, the processor 702, an external memory connected to the input/output interface 712, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

Systems, methods, and machine-readable media for controlling an upload of a block of data associated with an upload command have been described. In certain aspects, an interface module may be configured to obtain a cryptographic checksum for the block of data associated with the upload command. A checksum module may configured to compare the cryptographic checksum for the block of data associated with the upload command to a cryptographic checksum in an index storing cryptographic checksums identifying blocks of data previously uploaded to a server. If the cryptographic checksum for the block of data associated with the upload command matches the cryptographic checksum in the index, an upload module may be configured to cancel the upload of the block of data associated with the upload command.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" may be used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for controlling an upload of a block of data, the method comprising:
   receiving a plurality of blocks of data of an email attachment, wherein each block in the plurality of blocks of data is of a predetermined size, the predetermined size based on capabilities of at least one of a client device, a server, or a network;
   receiving a characterization for a block of data in the plurality of blocks of data;
   comparing, using a processor during the receiving of the plurality of blocks of data, the characterization for the block of data to a listing of characterizations in an index storing characterizations identifying previously stored blocks of data; and
   if the characterization for the block of data matches a characterization in the index:
      canceling the receiving of the block of data,
      identifying, using the characterization in the index, a previously stored block of data that is identical to the block of data in the plurality of blocks of data, and
      attaching the previously stored block of data to an email as part of the email attachment.

2. The computer-implemented method of claim 1, wherein a file name associated with the block of data in the plurality of blocks of data is different than a file name associated with the previously stored block of data.

3. The computer-implemented method of claim 1, wherein the characterization in the index is associated with a reference to the previously stored block of data.

4. The computer-implemented method of claim 1, further comprising:
   if the characterization for the block of data does not match any characterization in the index,
   completing the receiving of the block of data,
   calculating a characterization for the block of data, and
   storing the characterization for the block of data with a reference to the block of data in the index.

5. The computer-implemented method of claim 1, further comprising:
   if the characterization for the block of data does not match any characterization in the index,
   completing the receiving of the block of data, and
   storing the characterization of block of data with a reference to the uploaded block of data in the index.

6. The computer-implemented method of claim 1, wherein the characterization identifying the block of data is generated by a web browser on a client device using an HTML5 FileReader application programming interface (API).

7. The computer-implemented method of claim 1, wherein the plurality of blocks of data comprise a file.

8. The computer-implemented method of claim 1, wherein the characterization is a checksum.

9. The computer-implemented method of claim 8, wherein the checksum is a cryptographic checksum.

10. A system for controlling an upload of a block of data, the system comprising:
    one or more hardware processors; and
    a machine-readable medium comprising instructions stored therein, which when executed by the one or more hardware processors, cause the one or more hardware processors to perform operations comprising:
       receiving a file comprising an email attachment;
       receiving a characterization for a block of data in the file, wherein the block of data is of a predetermined size, the predetermined size based on capabilities of at least one of a client device, a server, or a network;
       comparing, during the receiving of the file, the characterization for the block of data in the file to a characterization in an index storing a plurality of characterizations, each characterization of the plurality of characterizations stored in the index identifying previously stored blocks of data and each characterization being associated with a reference to the block of data; and
       if the characterization for the block of data in the file matches a characterization in the index:
          canceling the receiving of the block of data in the file,
          identifying, using the characterization in the index, a previously stored block of data that is identical to the block of data in the file, and
          attaching the previously stored block of data to an email as part of the email attachment.

11. The system of claim 10, wherein if the characterization for the block of data in the file does not match any characterization in the index, the operations further comprise:
    completing the receiving of the block of data in the file;
    calculating a characterization for the block of data in the file; and
    storing the characterization for the block of data in the file with a reference to the block of data in the index.

12. The system of claim 10, wherein if the characterization for the block of data in the file does not match any characterization in the index, the operations further comprise:
    completing the receiving of the block of data in the file; and
    storing the characterization of block of data in the file with a reference to the block of data in the index.

13. The system of claim 10, wherein the characterization identifying the block of data in the file is generated by a web browser on a client device using an HTML5 FileReader application programming interface (API).

14. The system of claim 10, wherein the characterization is a checksum.

15. The system of claim 14, wherein the checksum is a cryptographic checksum.

16. A non-transitory machine-readable medium comprising instructions stored therein, which when executed by a machine, cause the machine to perform operations comprising:
    receiving a file comprising an email attachment, the file comprising a plurality of blocks of data, wherein each block in the plurality of blocks of data is of a predetermined size, the predetermined size based on capabilities of at least one of a client device, a server, or a network;
    receiving a characterization for a block of data in the plurality of blocks of data;
    comparing, during the receiving of the file, the characterization for the block of data to a listing of characterization in an index storing characterizations identifying previously stored blocks of data and references to locations of the previously stored blocks of data; and
    if the characterization for the block of data matches a characterization in the index:
       canceling the receiving of the block of data,
       identifying, using the characterization in the index, a previously stored block of data that is identical to the block of data in the plurality of blocks of data, and
       attaching the previously stored block of data to an email as part of the email attachment.

17. The non-transitory machine-readable medium of claim 16, the operations further comprising:

if the characterization for the block of data does not match any characterization in the index,
completing the receiving of the block of data,
calculating characterization for the block of data, and storing the characterization for the block of data with a reference to the block of data in the index.

18. The non-transitory machine-readable medium of claim 16, wherein the characterization is a checksum.

19. The non-transitory machine-readable medium of claim 18, wherein the checksum is a cryptographic checksum.

\* \* \* \* \*